March 30, 1926.  1,578,886

J. J. FRAZIER

CULTIVATOR

Filed Dec. 13, 1922

INVENTOR
John J. Frazier,
BY
Arthur M. Hood.
ATTORNEY

Patented Mar. 30, 1926.

1,578,886

UNITED STATES PATENT OFFICE.

JOHN J. FRAZIER, OF RUSHVILLE, INDIANA.

CULTIVATOR.

Application filed December 13, 1922. Serial No. 606,568.

*To all whom it may concern:*

Be it known that I, JOHN J. FRAZIER, a citizen of the United States, residing at Rushville, in the county of Rush and State of Indiana, have invented a new and useful Cultivator, of which the following is a specification.

My invention relates to improvements in cultivators and one of the objects of the invention is to provide a cultivator for corn which will readily travel between the rows of corn properly manipulating the ground and which will be substantially self-guiding and which will provide a means to permit the operator to ride thereon instead, as has heretofore been the custom, follow the same on foot.

Another object of my invention is to provide a cultivator which, while possessing the above mentioned advantages, will also turn the "down" corn which may have been knocked or blown across the row and replace the corn in its normal position so that the corn stalks and the like will not be cut by the cultivator.

For the purpose of disclosing my invention I have illustrated one embodiment thereof in the accompanying drawing in which—

Figure 1:
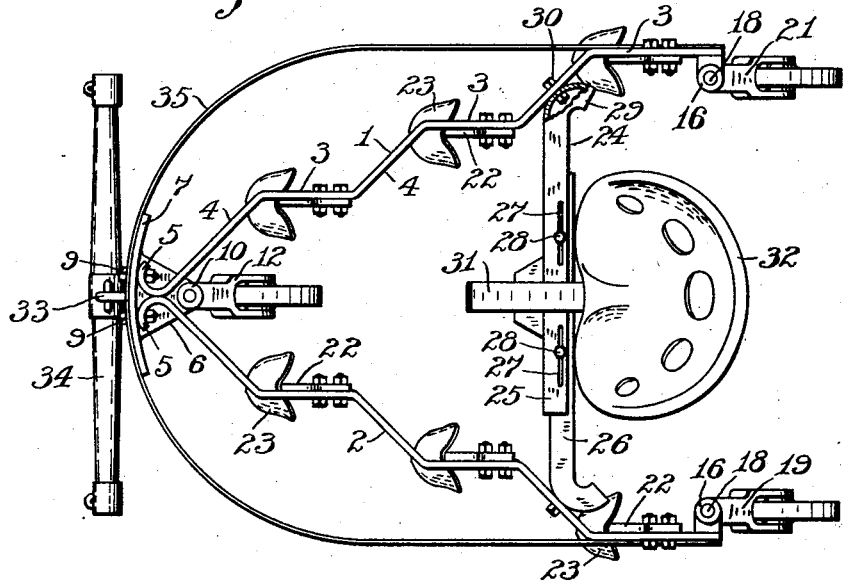
Fig. 1 is a plan view of a cultivator embodying my invention.
Figure 2:
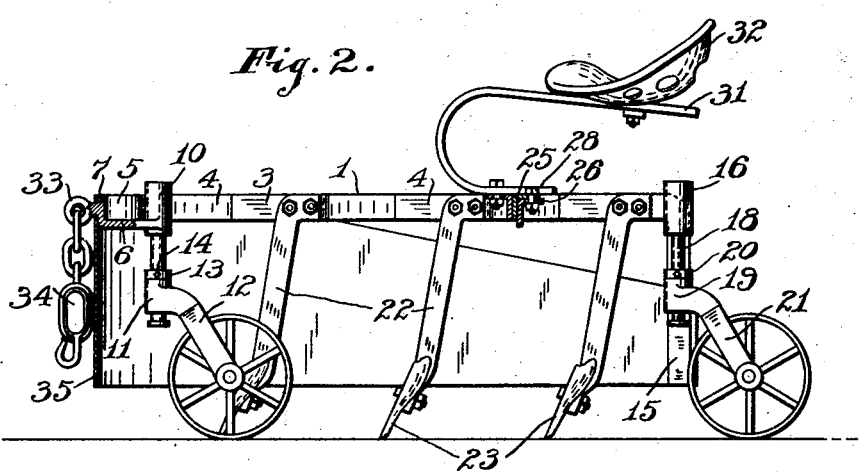
Fig. 2 is a longitudinal sectional view.
Figure 3:
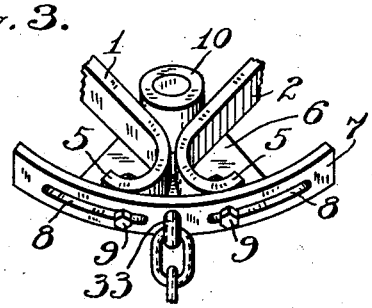
Fig. 3 is a detail view of means for securing the front ends of the cultivator frame together.

In the embodiment illustrated I provide a frame comprising the two side members 1 and 2 which are secured together at their forward end and preferably diverge laterally or rearwardly. Each of these side members is made of a metal bar and provided with a series of longitudinally extending portions 3 connected together by diagonally extending portions 4. The front end of each bar is preferably rounded as at 5 and is secured to a front supporting plate 6. This plate has an upwardly extending arcuate flange 7 which is slotted as at 8 to receive the retaining bolts 9 extending through the curved ends 5 of the side members. The supporting plate 6 has secured thereon a vertically extending socket 10 which receives one end of a spindle the lower end of which is adapted to extend through the bearing 11 of the front wheel frame 12. This spindle above the bearing 11 is provided with a collar 13 held in any adjusted position by a set screw 14 whereby the front end of the frame may be raised or lowered to adjust the cultivators to the desired depth.

The rear end of each of the side members 1 and 2 is provided with a downturned extension 15 to which is secured a sleeve 16 in which is secured the spindle 18 for the bearing 19 of the rear wheel. This bearing is held in its adjusted position on the spindle by means of an adjustable collar 20 similar to the collar 13 for the front wheels, whereby the height of the frame relative to the ground may be adjusted. The bearing 19 carries a wheel prong 21 similar to the wheel prong 12 and it will be noted that each of the wheel prongs is inclined rearwardly so that a caster action will be given to the wheels and the cultivator will tend to run in a straight line. Suitable cultivator prongs 22 having cultivator shovels 23 at their lower ends are secured to the respective longitudinally extending portions of the side frames so that the shovels will be arranged one behind the other but in staggered relation so that they will not track.

Near the rear end of the two side members I provide a cross brace 24 which comprises a pair of telescoped members 25 and 26, one having slots 27 to receive the bolts 28 of the other. These two members, at their outer end, are curved as at 29 and secured to the side members by bolts 30. By making the cross brace adjustable, provision is made for the adjustment of the two side members relatively to one another to increase or decrease the width of the path cultivated. Preferably on the cross member 24 I provide a spring support 31 for a driver's seat 32 and at the forward end the draft eye 33 is secured to the flange 7 of the support 6 whereby the usual single tree 34 may be attached to the implement.

In order that the "down" corn may be laid aside into the two rows between which the cultivator is operating and in order to also move to one side pumpkin vines and the like, I provide a shield 35 which is substantially U shaped and extends at its front end from the frame to within a comparatively short distance of the ground. This shield at its front end is secured to the arcuate flange 7 preferably by the same bolts which hold the frame at its forward end, being slotted coincidently with the arcuate flange 7. The rear ends of the shield are secured to the respective down-turned portions 15 of the side members and this shield or corn turner is preferably formed of sheet metal such as heavy galvanized sheet iron or the like, which is sufficiently resilient to permit the side wings to move with the rear ends of the side members when they are adjusted.

It will be seen that from the above construction I have provided a riding cultivator, the shovels of which may be adjusted to operate at any desired depth in the ground and which is practically self-guiding. Due to the U shaped shield the "down" corn will be turned aside from out of the path of the cultivator and at the same time the rounded corners of the shield will come in contact with the standing corn of the rows on each side of the cultivator, in event the cultivator tends to diverge from a straight line, and cause the cultivator to be moved back into its proper path between the rows of corn. Furthermore, due to the caster arrangement of the wheels, the wheels will tend to cause the cultivator to travel in practically a straight line and even when turned to one side or the other for any cause, tend to cause the cultivator to straighten out.

It is obvious that any form of cultivators may be mounted on the frame and that instead of supporting shovel cultivators of the type illustrated, different types of shovel cultivators may be mounted on the frame, or if desired, disk cultivators may be substituted for the shovel cultivators.

I claim as my invention:

In a corn cultivator, the combination with a frame including a pair of side members pivotally connected together at their forward ends and diverging rearwardly, of a transversely extending spacer bar connected to the rear end of each of said frame members, means for varying the length of said bar to vary the space between the rear ends of the frame members, a vertical spindle secured to the front ends of the frame members and a vertical spindle secured to each of the rear ends of the frame members, a castor wheel fork pivotally mounted on each of said spindles and vertically adjustable thereon to permit the bodily vertical adjustment of the frame, cultivators carried by said frame, a riding seat mounted on said spacer bar, and a U shaped shield having its legs extending rearwardly surrounding said frame and extending downwardly to substantially enclose the frame and the cultivators, the legs of the shield being laterally adjustable with the rear ends of the side members.

In witness whereof, I, JOHN J. FRAZIER, have hereunto set my hand at Indianapolis, Indiana.

JOHN J. FRAZIER.